(12) United States Patent
Nakajima

(10) Patent No.: US 7,930,292 B2
(45) Date of Patent: Apr. 19, 2011

(54) INFORMATION PROCESSING APPARATUS AND CONTROL METHOD THEREOF

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 11/275,674

(22) Filed: Jan. 24, 2006

(65) Prior Publication Data

US 2006/0173904 A1    Aug. 3, 2006

(30) Foreign Application Priority Data

Jan. 28, 2005  (JP) ................................ 2005-021824

(51) Int. Cl.
*G06F 17/30*  (2006.01)
*G06F 7/00*  (2006.01)

(52) U.S. Cl. ........ 707/711; 707/722; 707/741; 707/915; 382/137; 382/321

(58) Field of Classification Search .................. None
See application file for complete search history.

(56) References Cited

U.S. PATENT DOCUMENTS

| | | | |
|---|---|---|---|
| 5,416,849 A * | 5/1995 | Huang | 382/173 |
| 5,680,479 A | 10/1997 | Wang et al. | 382/176 |
| 5,889,896 A * | 3/1999 | Meshinsky et al. | 382/305 |
| 6,216,142 B1 * | 4/2001 | Iwasaki | 715/517 |
| 6,470,336 B1 * | 10/2002 | Matsukawa et al. | 707/4 |
| 6,556,627 B2 * | 4/2003 | Kitamura et al. | 375/240.26 |
| 6,748,533 B1 * | 6/2004 | Wu et al. | 713/176 |
| 7,126,993 B2 * | 10/2006 | Kitamura et al. | 375/240.26 |
| 2001/0037297 A1 * | 11/2001 | McNair | 705/40 |

(Continued)

FOREIGN PATENT DOCUMENTS

JP    5-216932    8/1993

(Continued)

OTHER PUBLICATIONS

Japanese Office Action dated Aug. 28, 2009 in corresponding Japanese Application No. 2005-021824, and partial English-language translation thereof.

*Primary Examiner* — Greta L Robinson
*Assistant Examiner* — James J Wilcox
(74) *Attorney, Agent, or Firm* — Fitzpatrick, Cella, Harper & Scinto

(57) ABSTRACT

An information processing apparatus for management of document images. In input document image data, when an area from which index information is to be extracted is designated, an index item for the designated area is set. Then, index extraction information where information specifying the designated area is linked with information indicating the set index item is generated. The generated index extraction information is combined with the document image data.

10 Claims, 14 Drawing Sheets

U.S. PATENT DOCUMENTS

| | | | |
|---|---|---|---|
| 2004/0139052 A1* | 7/2004 | Kazushige et al. | 707/1 |
| 2004/0220898 A1* | 11/2004 | Eguchi et al. | 707/1 |
| 2004/0260636 A1* | 12/2004 | Marceau et al. | 705/35 |
| 2005/0027511 A1* | 2/2005 | Ohguro | 704/9 |
| 2005/0137996 A1* | 6/2005 | Billsus et al. | 707/1 |
| 2005/0204282 A1* | 9/2005 | Harutunian et al. | 715/513 |
| 2005/0223395 A1* | 10/2005 | Maeta et al. | 719/331 |
| 2005/0257140 A1* | 11/2005 | Marukawa | 715/513 |
| 2005/0289182 A1* | 12/2005 | Pandian et al. | 707/104.1 |
| 2006/0036649 A1* | 2/2006 | Simske et al. | 707/200 |
| 2006/0047623 A1* | 3/2006 | Kimura et al. | 707/1 |
| 2006/0080276 A1* | 4/2006 | Suzuki et al. | 707/1 |
| 2006/0119890 A1 | 6/2006 | Nakajima | 358/1.15 |
| 2006/0242131 A1 | 10/2006 | Okabe et al. | 707/3 |
| 2007/0016552 A1* | 1/2007 | Suda et al. | 707/1 |
| 2007/0094231 A1* | 4/2007 | Kim | 707/1 |

FOREIGN PATENT DOCUMENTS

| | | |
|---|---|---|
| JP | 6-68301 | 3/1994 |
| JP | 06-068301 | 3/1994 |
| JP | 6-223113 | 8/1994 |
| JP | 2000-215210 | 8/2000 |
| JP | 2001-084254 | 3/2001 |

* cited by examiner

| FOLDER ID | PARENT FOLDER ID | FOLDER NAME | DATE OF GENERATION |
|---|---|---|---|
| | | | |

| DOCUMENT ID | PARENT FOLDER ID | DOCUMENT NAME | SIZE | NUMBER OF PAGES | TYPE | DATE OF GENERATION |
|---|---|---|---|---|---|---|
| | | | | | | |

| PAGE ID | PARENT DOCUMENT ID | PAGE NUMBER | TYPE | PAPER SIZE | FILE SIZE | VOLUME ID |
|---|---|---|---|---|---|---|
| | | | | | | |

FIG. 4A

| VOLUME ID | VOLUME FILE NAME | OFFSET | SIZE |
|---|---|---|---|

| IMAGE DATA | IMAGE DATA | DOCUMENT DATA | IMAGE DATA |
|---|---|---|---|

| INDEX ID | INDEX NAME | TYPE |
|---|---|---|
| | | |

| DATA ID | INDEX ID | INDEX DATA | DOCUMENT ID |
|---|---|---|---|
| | | | |

ABC Bank
000-222-444
123 xyz street
Los Angeles CA77777

Date   26th August 2004

Pay   ZZZZZ Sales Company $   3200.34

Three thousands and two hundreds and 34/00

Bank Number

Sign   Oanon Taro

FIG. 11

```
<?xml version=1.0?>
-<INDEX>
  -<ZONE_1>
      -<POSITION>
         <X>50</X>
         <Y>50</Y>
          <HEIGHT>100</HEIGHT>
          <WIDTH>800</WIDTH>
      </POSITION>
      <INDEX_NAME>Company Name</INDEX_NAME>
      -<OCR_INFO>
          <CHAR_TYPE>1</CHAR_TYPE>
          <LANGUAGE>3</LANGUAGE>
          <ORIENTATION>2</ORIENTATION>
      </OCR_INFO>
   </ZONE_1>
  -<ZONE_2>
      -<POSITION>
```

1101 — POSITION block
1102 — INDEX_NAME
1103 — OCR_INFO block

FIG. 12

ABC Bank 000-222-444
123 xyz street
Los Angeles CA77777

Date

Pay _____

$ _____

Bank Number

Sign _____

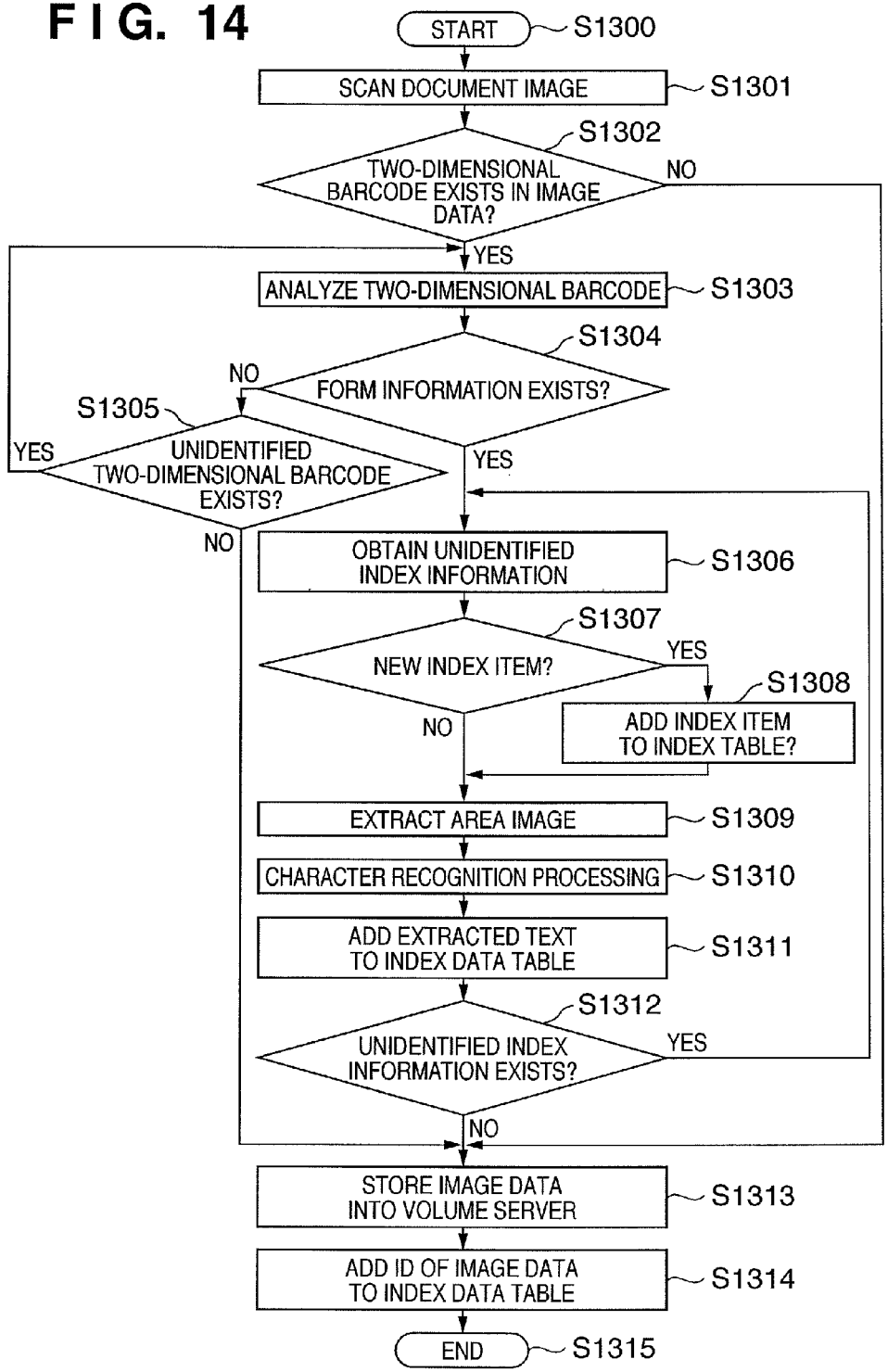

INFORMATION PROCESSING APPARATUS AND CONTROL METHOD THEREOF

FIELD OF THE INVENTION

The present invention relates to an information processing apparatus and its control method for management of document data by linking index information with the data.

BACKGROUND OF THE INVENTION

Recently, a document management system is needed for managing various documents (paper documents, facsimile letters, e-mail messages, Web pages and the like) existing in a company, by digitizing and classifying the documents in a library on a computer for executive utilization and search. In such document management system, for example, a paper document generated in a predetermined document form is read with a scanner, and is stored as image data in a document server. At the same time, index information as text data, indicating a company name, an address and the like, is extracted from the image data, and linked with the image data and stored. For example, information indicating the location of the associated image data (URL or the like) is held with the index. In this manner, a search for a desired document (image) can be easily made from an index. Further, Japanese Patent Application Laid-Open No. 6-223113 discloses a system to extract a keyword from an image in a document including text(s) and image(s). According to the system disclosed in this publication, an image is subjected to character recognition, then a keyword is selected from comparison between words obtained by natural language processing and a keyword table.

However, in the above document management system, how to link information in image data with an index item is a problem. As one method for extracting an index from image data, proposed is performing character recognition in a predetermined area upon scanning of paper document and storing obtained text information as index information. In this method, the predetermined area is determined by a user's previous setting a character recognition area of image data and an index item to be linked with the area. Accordingly, in this method, it is necessary to previously set "what area is to be subjected to character recognition as index item data (here referred to as "index extraction information")" in correspondence with the form of document to be scanned. By this necessity of setting work, document registration in the document management system is complicated.

Further, it may be arranged such that the index extraction information for plural types of document forms are previously registered, and the user selects a desired setting in correspondence with a document to be read. However, when many documents are to be read and plural types of form exist, it is necessary for the user to select a setting for each document form. Also, the document registration is complicated. Further, every time a new document form, for which index extraction information has not been set, appears, it is necessary to perform the setting and registration of index extraction information in the document management system.

SUMMARY OF THE INVENTION

The present invention has been made in consideration of the above problems, and has its object to facilitate registration of document image in a document management system.

According to one aspect of the present invention, there is provided an information processing apparatus for managing document images, comprising: a designation unit configured to designate an area from which index information is to be extracted, in inputted document image data; a setting unit configured to set an index item for the area designated by the designation unit; a generation unit configured to generate index extraction information where information specifying the designated area is linked with information indicating the index item set by the setting unit; and a combining unit configured to combine the index extraction information generated by the generation unit with the document image data.

According to another aspect of the present invention, there is provided an information processing apparatus comprising: a designation unit configured to designate an area to be subjected to a character recognition processing, in an input document image data; a generating unit configured to generate a pattern image specifying the an area designated by the designation unit; and a combining unit configured to combine the pattern image generated by the generation unit with the document image data.

Further, according to another aspect of the present invention, there is provided an information processing apparatus for managing document images, comprising: an analysis unit configured to analyze information recorded in a predetermined form, from input document image data, and extract index extraction information including information to specify an area and an index item set for the area; a recognition unit configured to extract an image of the area specified with the index extraction information extracted by the analysis unit, and perform character recognition processing on the extracted image; and a registration unit configured to register the document image data, with character data obtained by the recognition unit, as index information for the index item indicated with the index extraction information.

Note that preferably, the index extraction information is combined as a pattern image with document image data. As the pattern image, an image embedded as an electronic watermark may be used as well as a visible image such as a two-dimensional barcode.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3C illustrate examples of table definition in an attribute storage unit of the document management server;

FIGS. 4A and 4B illustrate examples of data structure in a volume storage unit of the document management server;

FIGS. 5A and 5B illustrate examples of table definition in an index storage unit of the index management server;

FIG. 9 illustrates an example of a predetermined format image;

FIG. 11 illustrates an example of form information stored in a two-dimensional barcode;

FIG. 12 illustrates an example of a predetermined format image with two-dimensional barcode;

FIG. 14 is a flowchart showing document registration processing by the document management client.

DETAILED DESCRIPTION OF THE PREFERRED EMBODIMENTS

Preferred embodiments of the present invention will now be described in detail in accordance with the accompanying drawings.

Figure 1:
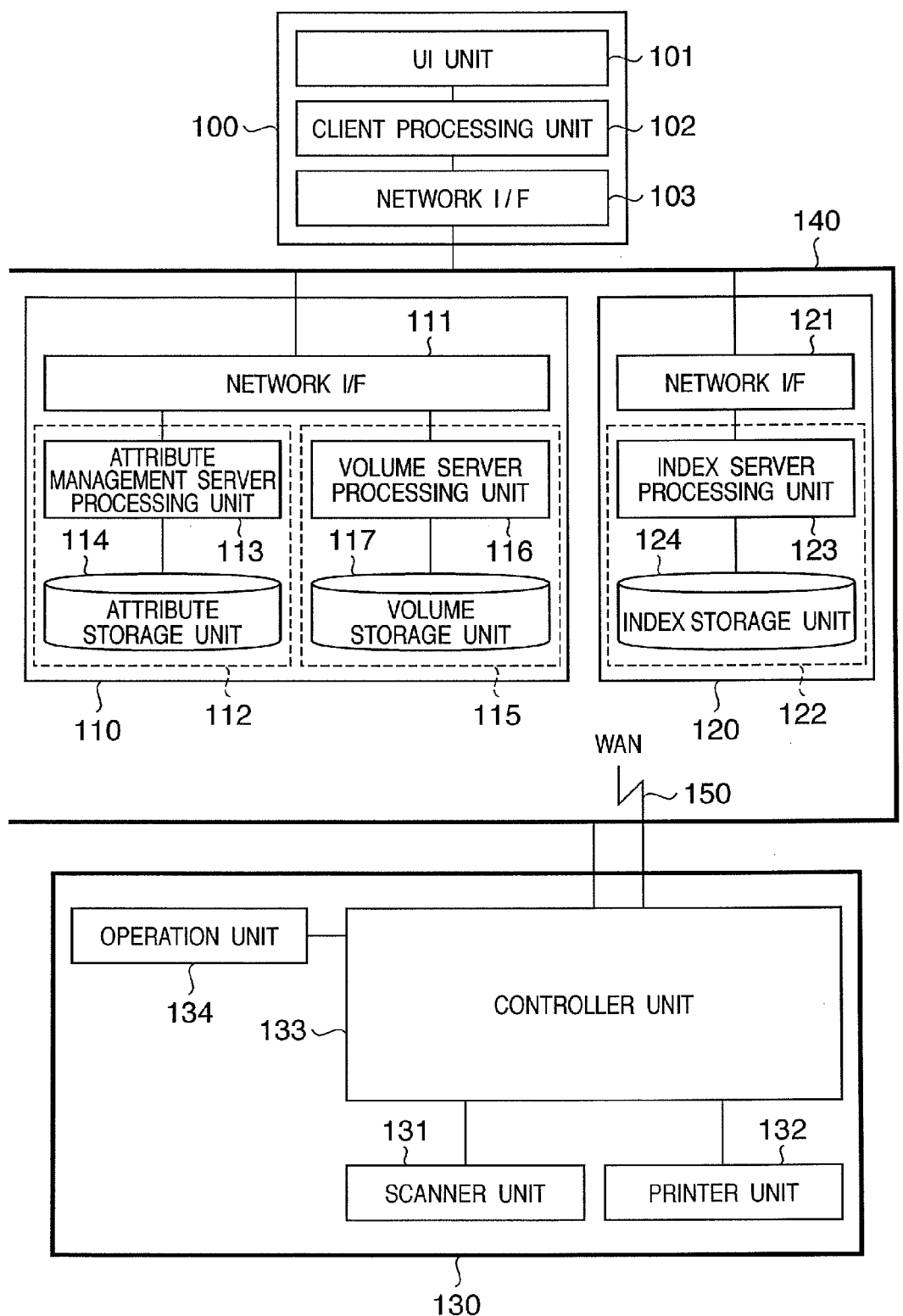
FIG. 1 is a block diagram showing the entire configuration of a document management system according to an embodiment of the present invention.

FIG. 1 is a block diagram showing the entire configuration of a document management system according to an embodiment of the present invention. The document management system includes a document management client 100, a document management server 110, an index management server 120 and a digital multi-function device 130. These devices are interconnected via a network 140. Note that personal computers or the like may be utilized as the document management client 100, the document management server 110 and the index management server 120.

The document management client 100 performs issuance of a request for search for a document managed by the document management server 110, display of a retrieved document, and reference to an index managed by the index management server 120. The document management client 100 has a user interface (UI) unit 101, a client processing unit 102 and a network I/F 103. The UI unit 101 receives operator's instructions regarding respective functions of the document management client 100 such as document registration, document search, display and index reference, and provides various information such as processed result to the operator. The UI unit 101 has a display device such as a CRT or a liquid crystal display and input devices such as a keyboard and a pointing device. The client processing unit 102, having a CPU, a memory and the like, performs processings for the respective functions of the document management client 100 such as document registration, document search, display and index reference. When processing for the document management server 100 has occurred, the client processing unit 102 transmits various request commands via the network I/F 103 to the document management server 110 and the index management server 120 and receives responses from the servers.

The document management server 110 manages image data and document data read with the document management client 100 and the digital multi-function device 130. The document management server 110 has a network I/F 111, an attribute management server unit 112 and a volume server unit 115. The attribute management server unit 112 and the volume server unit 115 may be realized with one computer as in the case of the present embodiment, or with different computers interconnected with the network 140. The network I/F 111, connected with the network 140, performs processing of network protocol such as TCP/IP.

The attribute management server unit 112 manages the relation of inclusion among folders, documents and pages and their attributes and the like in order to manage image data and document data as documents stored in hierarchized folders. The attribute management server unit 112 has an attribute management server processing unit 113 and an attribute storage unit 114. The attribute management server processing unit 113, having a CPU, a memory and the like, receives a request command via the network I/F 111 from the client processing unit 102. Then, the attribute management server processing unit 113 performs processing such as update or search on the attribute storage unit 114 in accordance with the received request command, and transmits the result of processing to the client processing unit 102. The attribute storage unit 114, which holds folder attributes, document attributes, page attributes and the like, is generally realized with a hard disk or the like.

The volume server unit 115 holds and manages actual data such as document data and/or image data corresponding to pages managed by the attribute management server unit 112. The volume server unit 115 has a volume server processing unit 116 and a volume storage unit 117. The volume server processing unit 116, having a CPU, a memory and the like, receives a request command via the network I/F 111 from the client processing unit 102. Then the volume server processing unit 116 performs processing such as update and data acquisition on the volume storage unit 117 in accordance with the received request command, and transmits the result of processing to the client processing unit 102. The volume storage unit 117, which holds document data and image data, is generally realized with a hard disk or the like.

The index management server 120 manages indices as keywords for search for image data and document data stored in the document management server 110. The index management server 120 has a network I/F 121 and an index server unit 122. Note that the index server unit 122 may be independently realized with one computer as in the case of the present embodiment, or with the same computer as that of the attribute management server unit 112 and the volume server unit 115. The network I/F 121, connected with the network 140, performs processing of network protocol such as TCP/IP.

The index server unit 122 manages the indices as keywords for document search, with linkages with document information managed by the attribute management server unit 112. The index server unit 122 has an index server processing unit 123 and an index storage unit 124. The index server processing unit 123, having a CPU, a memory and the like, receives a request command via the network I/F 121 from the client processing unit 102. Then the index server processing unit 123 performs processing such as update and data acquisition on the index storage unit 124 in accordance with the received request command, and transmits the result of processing to the client processing unit 102. The index storage unit 124, which holds index data, is generally realized with a hard disk or the like.

The digital multi-function device 130 is an image forming apparatus having multiple functions as a copier, a scanner, a printer and a facsimile machine. As shown in FIG. 1, the digital multi-function device 130 has a scanner unit 131 as an image input device, a printer unit 132 as an image output device, a controller unit 133, and an operation unit 134 as a user interface. The scanner unit 131, the printer unit 132 and the operation unit 134 are respectively connected with the controller unit 133, and the controller unit 133 is connected with the network (LAN) 140 and a network (WAN) 150. Note that in the present embodiment, a public line is employed as the WAN 150.

The controller unit 133 performs processing for scan job or the like based on input information from the operation unit 134, and provides information such as apparatus status or job status to the operation unit 134.

Figure 2:
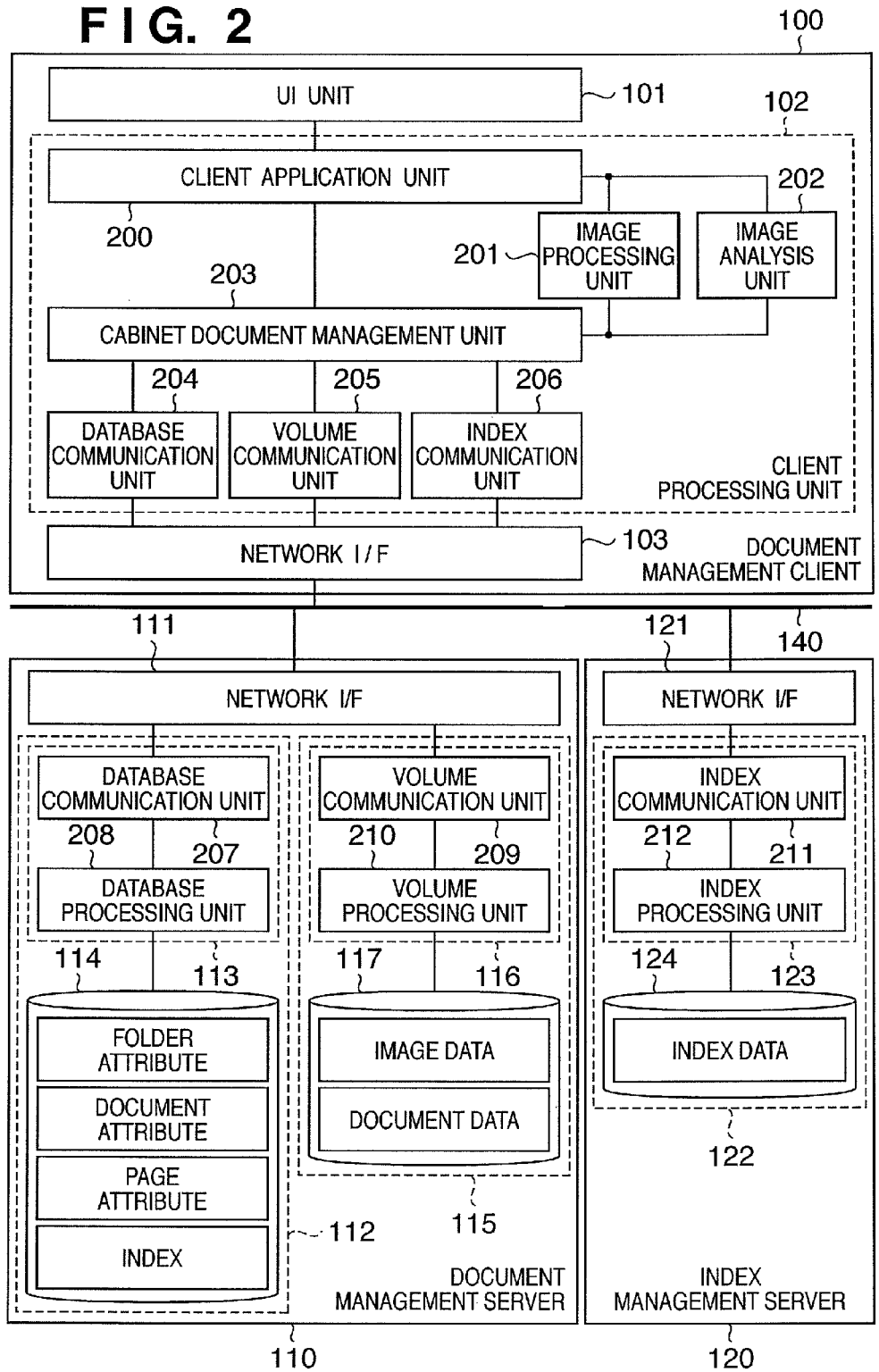
FIG. 2 is a block diagram showing functional constructions of a document management client, a document management server and an index management server of the document management system.

FIG. 2 is a block diagram showing functional constructions of the document management client 100, the document management server 110 and the index management server 120 in FIG. 1. Note that in FIG. 2, the constituent elements corresponding to those in FIG. 1 have the same reference numerals.

The client processing unit 102 of the document management client 100 has a client application unit 200, an image processing unit 201, an image analysis unit 202, a cabinet document management unit 203, a database communication unit 204, a volume communication unit 205, and an index communication unit 206.

The client application unit 200 performs processing for the respective functions of the document management client 100 in accordance with instructions from the UI unit 101, and controls the display screen of the UI unit 101. Further, when processing for the attribute management server unit 112, the volume server unit 115 and the index server unit 122 has occurred, the client application unit 200 supplies the request to the cabinet document management unit 203. Then the client application unit 200 receives the result of processing in accordance with the request from the cabinet document management unit 203. The image processing unit 201 performs image processing such as image expansion, image compression, color space conversion, base removing, enlargement/reduction, rotating, combining and generation of two-dimensional barcode in accordance with requests from the client application unit 200 and the cabinet document management unit 203. The image analysis unit 202 performs processing such as image analysis, area dividing and character recognition in accordance with requests from the client application unit 200 and the cabinet document management unit 203.

The cabinet document management unit 203 issues a request to the attribute management server unit 112, the volume server unit 115 and the index server unit 122, in the form of object model including a cabinet, a folder, a document and a page. That is, when processing such as reference to or update of a folder attribute, a document attribute or a page attribute has occurred, the cabinet document management unit 203 supplies the request to the database communication unit 204, and receives the result of processing from the database communication unit 204. Further, when processing such as registration, deletion or acquisition of image data or document data has occurred, the cabinet document management unit 203 supplies the request to the volume communication unit 205, and receives the result of processing from the volume communication unit 205. Further, when processing such as reference to or update of an index has occurred, the cabinet document management unit 203 supplies the request to the index communication unit 206, and receives the result of processing from the index communication unit 206.

The database communication unit 204 transmits a request command to the attribute management server 112 via the network I/F 103 to the database communication 207 by the SQL (Structured Query Language) protocol defined on the TCP/IP protocol, and receives a response command from the database communication unit 207. The volume communication unit 205 transmits a request command to the volume server unit 115 via the network I/F 103 to the volume communication unit 209 by the RPC (Remote Procedure Call), and receives a response command from the volume communication unit 209. The index communication unit 206 transmits a request command to the index server unit 122 via the network I/P 103 to the index communication unit 211 by the SQL (Structured Query Language) protocol defined on the TCP/IP protocol. Then the index communication unit 206 receives a response command from the database communication unit 211.

The attribute management server processing unit 112 of the document management server 110 has a database communication unit 207 and a database processing unit 208. The database communication unit 207 receives a request command to the attribute management server unit 112 via the network I/F 111 from the database communication unit 204 by the SQL (Structured Query Language) protocol defined on the TCP/IP protocol. Then, the database communication unit 207 supplies the received request to the database processing unit 208, and transmits the corresponding result of processing, as a response command, to the database communication unit 204. The database processing unit 208 is a RDBMS (Relational Database Management System) for management of relation of inclusion among folders, documents and pages and their attributes. The database processing unit 208 performs processing such as update and search on the attribute storage unit 114 holding a database file in correspondence with a command supplied from the database communication unit 207.

FIGS. 3A to 3C illustrate examples of table definition in the attribute storage unit 114. In FIGS. 3A to 3C, a folder management table 300, a document management table 301 and a page management table 302 are used by the database processing unit 208 for management of relation of inclusion among folders, documents and pages and their attributes.

In the folder management table 300, "Folder ID" is used for identification of a folder. "Parent Folder ID" is used for identification of a parent folder of the folder. "Folder Name" indicates a name given to the folder. "Date of Generation" indicates the date of generation of the folder. When a folder is newly generated, the above contents for the new folder are registered in the folder management table 300.

Further, in the document management table 301, "Document ID" is used for identification of a document. "Parent Folder ID" is used for identification of a folder to which the document belongs. "Document Name" is a name given to the document. "Size" indicates the size of the document (e.g., the number of bytes). "Number of Pages" indicates the number of pages of the document. "Document Type" indicates whether or not the document is an image document as a group of image data and indicates the application by which the document data was generated. "Date of Generation" indicates the date of generation of the document. When a document is newly generated, the above contents for the new document are registered in the document management table 301.

Further, in the page management table 302, "Page ID" is used for identification of a page. "Parent Document ID" is used for identification of a document to which includes the page. "Page Number" indicates the page number of the page. "Type" indicates the file format of the page data of the page. "Paper Size" indicates the paper size when the page is image data. "File Size" indicates the size of a file of the page. "Volume ID" is used for identification of image data or document data managed by the volume server unit 115. When a document is newly registered, the above contents for each page of the new document are registered in the page management table 302.

Returning to FIG. 2, the volume server processing unit 116 of the document management server 110 has a volume communication unit 209 and a volume processing unit 210. The volume communication unit 209 receives a request command to the volume server unit 115 via the network I/F 111 from the volume communication unit 205 by RPC (Remote Procedure Call). Then the volume communication unit 209 supplies the request to the volume processing unit 210, and transmits the result of processing, as a response command, to the volume communication unit 205. The volume processing unit 210 performs processing such as update or data acquisition on the volume storage unit 117 holding volume files in correspondence with the command supplied from the volume communication unit 209.

FIGS. 4A and 4B illustrate examples of data structure of a file stored in the volume storage unit 117. The volume storage unit 117 has a volume storage file 401 (FIG. 4B) holding actual data of image data and document data, and a volume management file 400 (FIG. 4A) managing the data.

In the volume management file 400, "Volume ID" is used for identification of actual data. "Volume File Name" is a file name for identification of a volume storage file in which the data is stored. "Offset" is a offset value indicating a storage start position of the data in the volume storage file. "Size" is the size of the data (e.g., the number of bytes). Further, in the volume storage file 401, actual image data and document data are continuously stored. In this manner, the actual data of a document is stored as one file in the volume storage unit 117, and a volume ID is allocated by page of the document, and stored in the format as shown in FIGS. 4A and 4B.

Again returning to FIG. 2, the index server processing unit 123 of the index management server 120 has an index communication unit 211 and an index processing unit 212. The index communication unit 211 receives a request command to the index server unit 122 via the network I/F 121 from the index communication unit 206 by the SQL (Structured Query Language) protocol defined on the TCP/IP protocol. Then, the index communication unit 211 supplies the request to the index processing unit 212, and transmits the result of processing, as a response command, to the index communication unit 206. The index processing unit 212 performs processing such as update or data acquisition on the index storage unit 124 holding index files in correspondence with the supplied command.

FIGS. 5A and 5B illustrate examples of table definition in the index storage unit 124. The index storage unit 124 holds an index table 500 used by the index processing unit 212 for management of index data and an index data table 501.

In the index table 500, "Index ID" is used for identification of an index item. "Index Name" is the name of the index item. "Type" indicates whether the data of the index item is a numerical value or a character string. In the index data table 501, "Data ID" is used for identification of the index data. "Index ID" is used for identification of the index item name. "Index Data" is the data of the index. "Document ID" is the ID of a document with which the index data is linked. The index data table exists for each data type.

Figure 6:
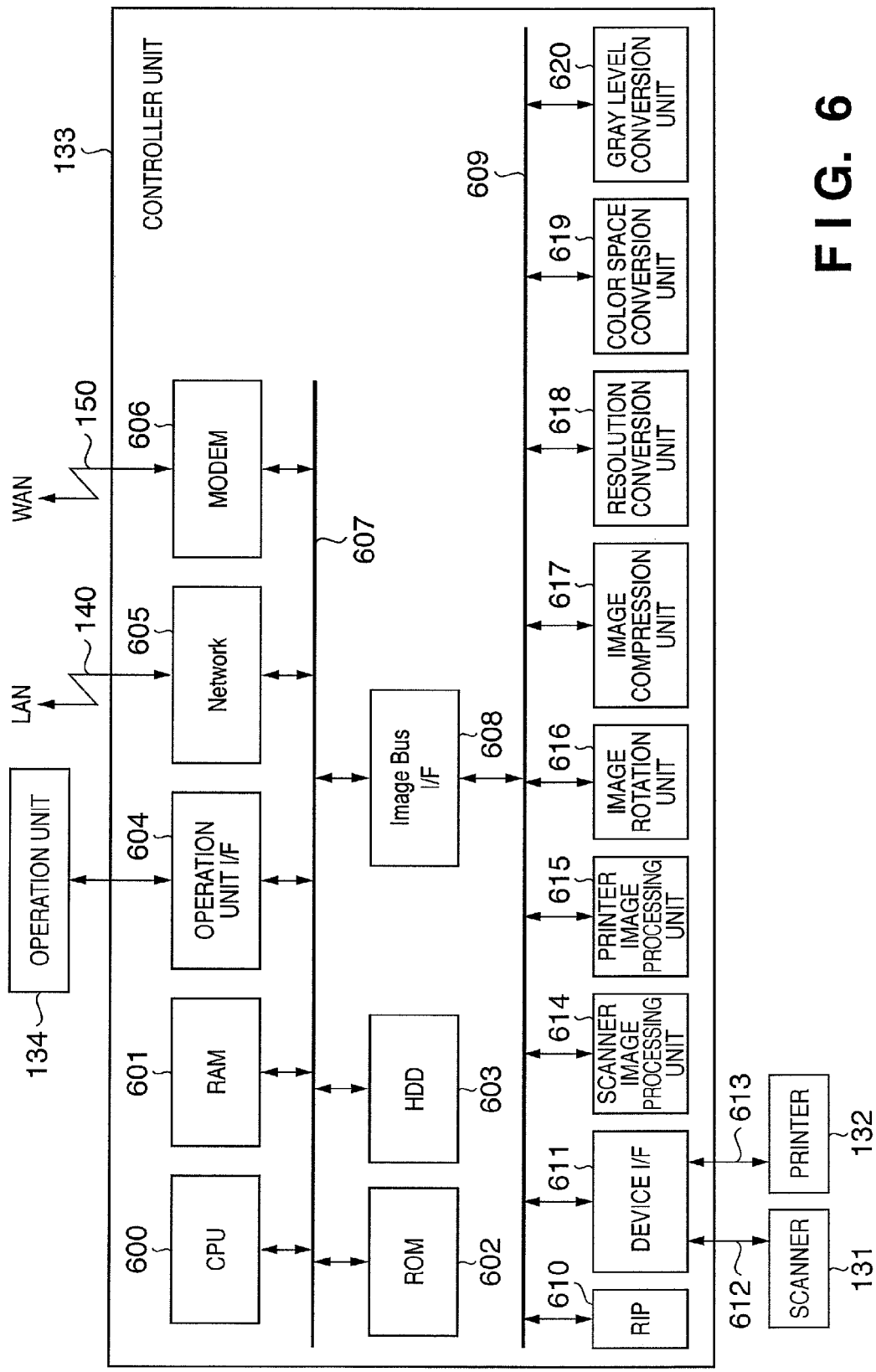
FIG. 6 is a block diagram showing a construction of a digital multi-function device in the document management system according to the embodiment.

FIG. 6 is a block diagram showing a construction of the digital multi-function device 130 in FIG. 1. In FIG. 6, the constituent elements corresponding to those in FIG. 1 have the same reference numerals. A controller unit 133 is connected with a scanner unit 131 as an image input device and a printer unit 132 as an image output device. On the other hand, the controller unit 133 is connected with the network (LAN) 140 or the public line (WAN) 150, thereby the controller unit 133 inputs/outputs image information and device information.

In the controller unit 133, a CPU 600 is a controller to control the entire digital multi-function device. A RAM 601 is a system work memory for the operation of the CPU 600. Further, the RAM 601 is used as an image memory (buffer memory) for temporarily storing input image data. A ROM 602 is a boot ROM in which a system boot program is stored. A hard disk drive (HDD) 603 holds system software, image data and the like.

The operation unit I/F 604 is an interface unit with respect to the operation unit 134. The operation unit I/F 604 outputs image data to be displayed on the operation unit 134 to the operation unit 134. Further, the operation unit I/F 604 transmits information inputted by the operator from the operation unit 134 to the CPU 600. A network unit 605, connected with the network (LAN) 140, inputs/outputs information. A modem 606, connected with the public line (WAN) 150, inputs/outputs image information. The above devices are connected with a system bus 607.

An image bus I/F 608 is a bus bridge which connects the system bus 607 to an image bus 609 and converts data structure. The image bus 609, used for high-speed transfer of image data, is a PCI bus or an IEEE 1394 bus. On the image bus 609, the following devices are arranged.

A raster image processor (RIP) 610 expands a PDL code to a bitmap image. A device I/F unit 611 connects the scanner unit 131 and the printer unit 132 as image input/output devices to the controller unit 133 via an image input unit interface 612 and a printer unit interface 613. A scanner image processing unit 614 performs correction, process, and editing on input image data. Further, the scanner image processing unit 614 has a function of determining whether an input image is a color original or a monochrome original from a chromaticness signal of the image and holding the result of determination. A printer image processing unit 615 performs correction, process, and editing on output image data.

An image rotation unit 616, in cooperation with the scanner image processing unit 614, rotates an image at the same time of reading the image from the scanner unit 131, and stores the image into a memory (e.g., the RAM 601). Further, the image rotation unit 616 rotates an image stored in the memory and stores the rotated image into the memory again, or performs print-output of an image stored in the memory, while rotating the image in cooperation with the printer image processing unit 615. An image compression unit 617 performs JPEG compression/expansion processing on multivalue image data, and JBIG, MMR, MR or MH compression/expansion processing on binary image data. A resolution conversion unit 618 performs resolution conversion processing on an image stored in the memory and stores the processed image into the memory. A color space conversion unit 619 converts, e.g., a YUV image stored in the memory, into an Lab image by matrix computation, and stores the converted image into the memory. A gray level conversion unit 620 converts, e.g., a 8-bit and 256-level image stored in the memory into a 1-bit and binary image by error-diffusion processing or the like and stores the converted image into the memory. It may be arranged such that the image rotation unit 616, the image compression unit 617, the resolution conversion unit 618, the color space conversion unit 619 and the gray level conversion unit 620 operate in cooperation with each other. Accordingly, when an image on the memory is subjected to image rotation and resolution conversion, the both processings can be performed without memory.

Figure 7:
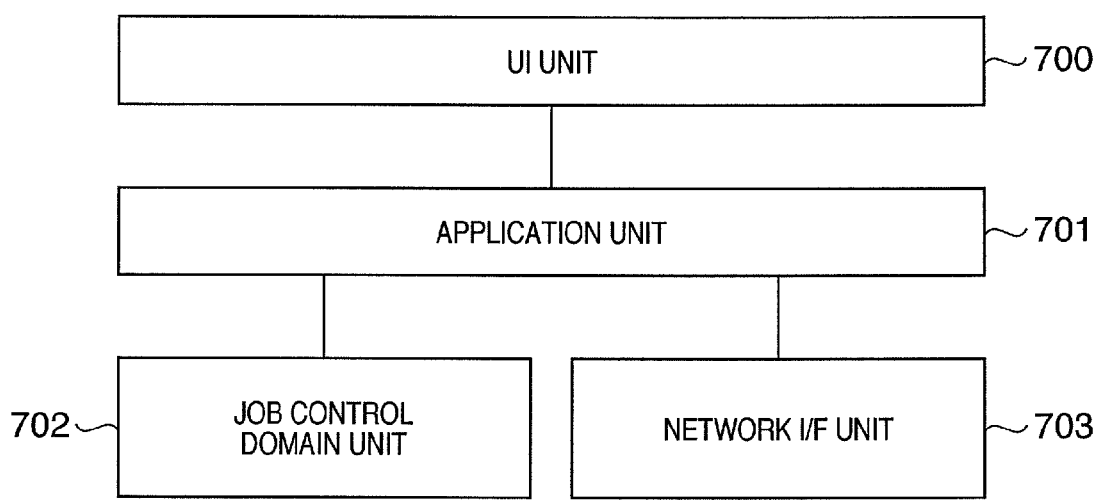
FIG. 7 is a block diagram showing a functional construction of system software of the digital multi-function device.

FIG. 7 is a block diagram showing a functional construction of system software in the digital multi-function device 130 in FIG. 1. A user interface (UI) unit 700 supplies input information from the operator to an application unit 701, receives the result of processing from the application unit 701 and generates a screen image displayed on the operation unit 134. The application unit 701 controls execution of processing in accordance with a request from the UI unit 700. For example, when scanning is requested, the application unit 701 sends a scan job, with a designated scan setting, to a job control domain unit 702, and receives information on apparatus status or job status from the job control domain unit 702. The job control domain unit 702 controls plural job processings such as a scan job, a copying job, a print job and a facsimile job. For example, when a scan job has been received, the job control domain unit 702 operates the scanner unit 131 based on a designated scan setting, to read an original and generate image data, and store the data. A network I/F unit 703, connected with the network 140, performs processing of network protocol such as TCP/IP.

In the document management system having the above construction, when a document to be registered has been newly read, necessary index information is extracted from the document and registered in the index data table 501 in FIG. 5B. In the present embodiment, information indicating an area of document image to be subjected to character recognition as index item data is previously recorded in the document with a two-dimensional barcode. By utilizing such document form with two-dimensional barcode, upon document registration, the two-dimensional barcode is analyzed, then character recognition is performed on a designated area in the document image, and information is extracted as data of the designated index item.

Figure 8:
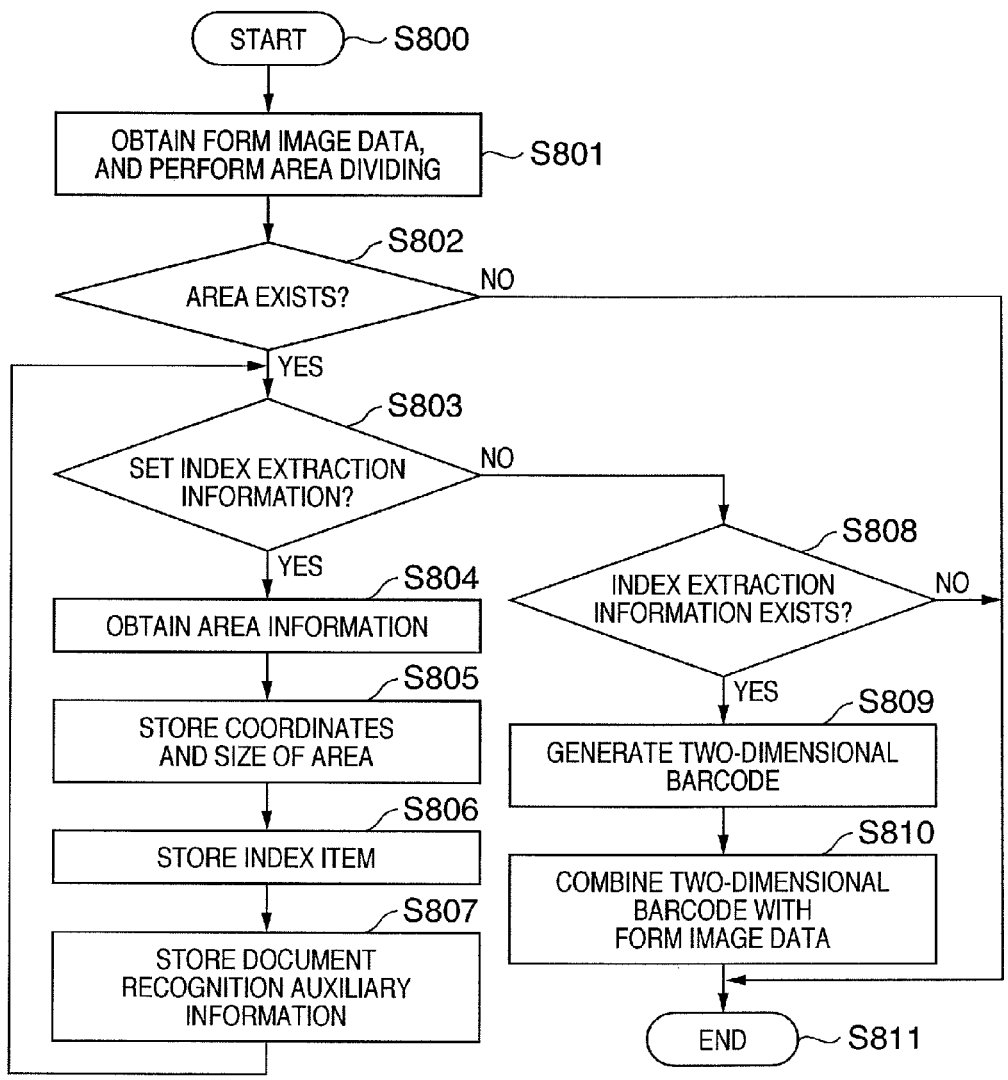
FIG. 8 is a flowchart showing processing for generation of form data with two-dimensional barcode, in the document management client.

Next, generation of the above two-dimensional barcode in the document management client 100 will be described with reference to the flowchart of FIG. 8.

First, the operator selects a form data image as an original from document images stored in the document management server 110 by the document management client 100. Otherwise, it may be arranged such that a form data image as an original is read by scanning from the digital multi-function device 130. When generation of form data with two-dimensional barcode is designated, the present process starts (step S800).

Figure 10:
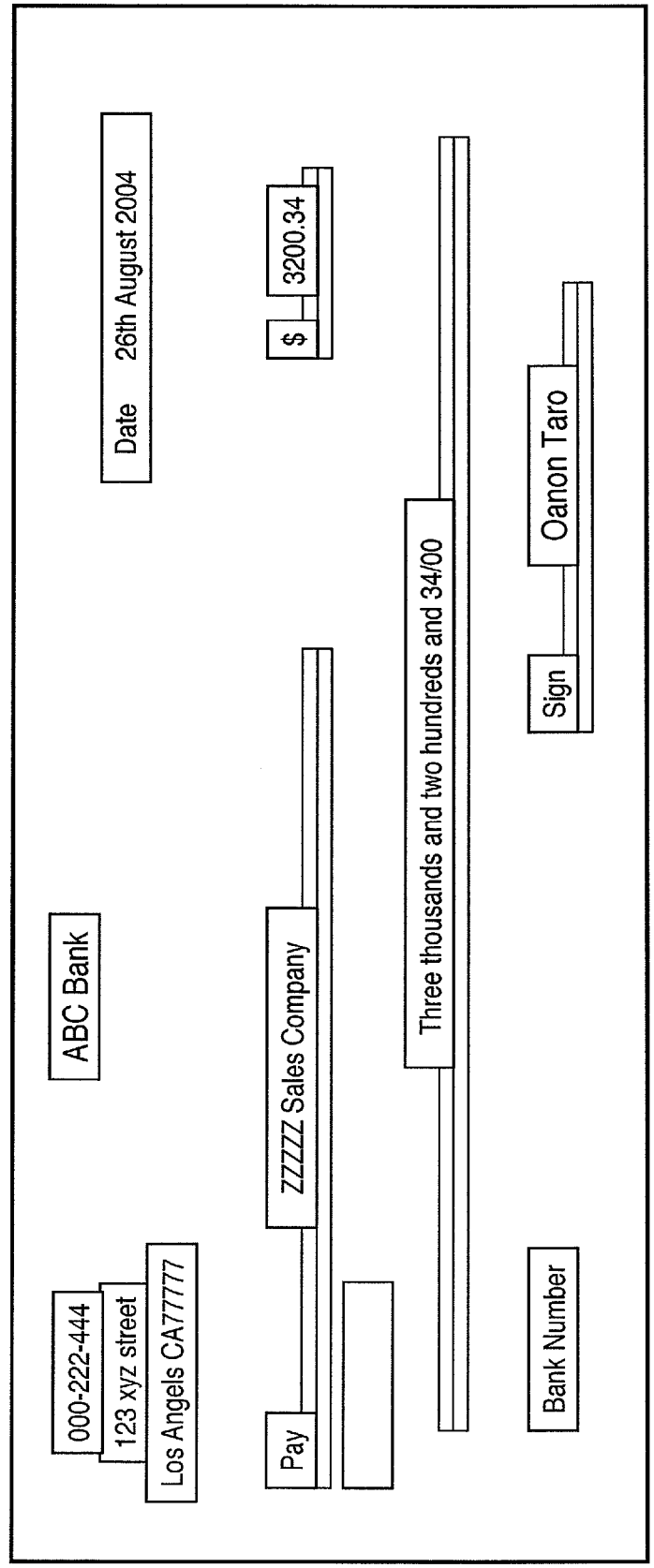
FIG. 10 illustrates an example of an area-divided document image.

The form data image has a predetermined format as shown in FIG. 9. The selected form data image is transferred to the image analysis unit 202. The image analysis unit 202 performs area dividing by a block selection technique on the transferred form data image (S801). Note that as the technique applied to the area dividing processing, the method disclosed in Japanese Patent Application Laid-Open No. 6-68301 may be employed. According to the area dividing, the number of obtained areas, attributes of the respective areas, positions of the respective areas on the image, sizes of the areas and the like are obtained as layout analysis data. The client application unit 200 displays an area-divided form data image on the UI unit 101 based on the analysis data. FIG. 10 is a conceptual diagram showing the result of area dividing of the document image in FIG. 9.

Figure 13:
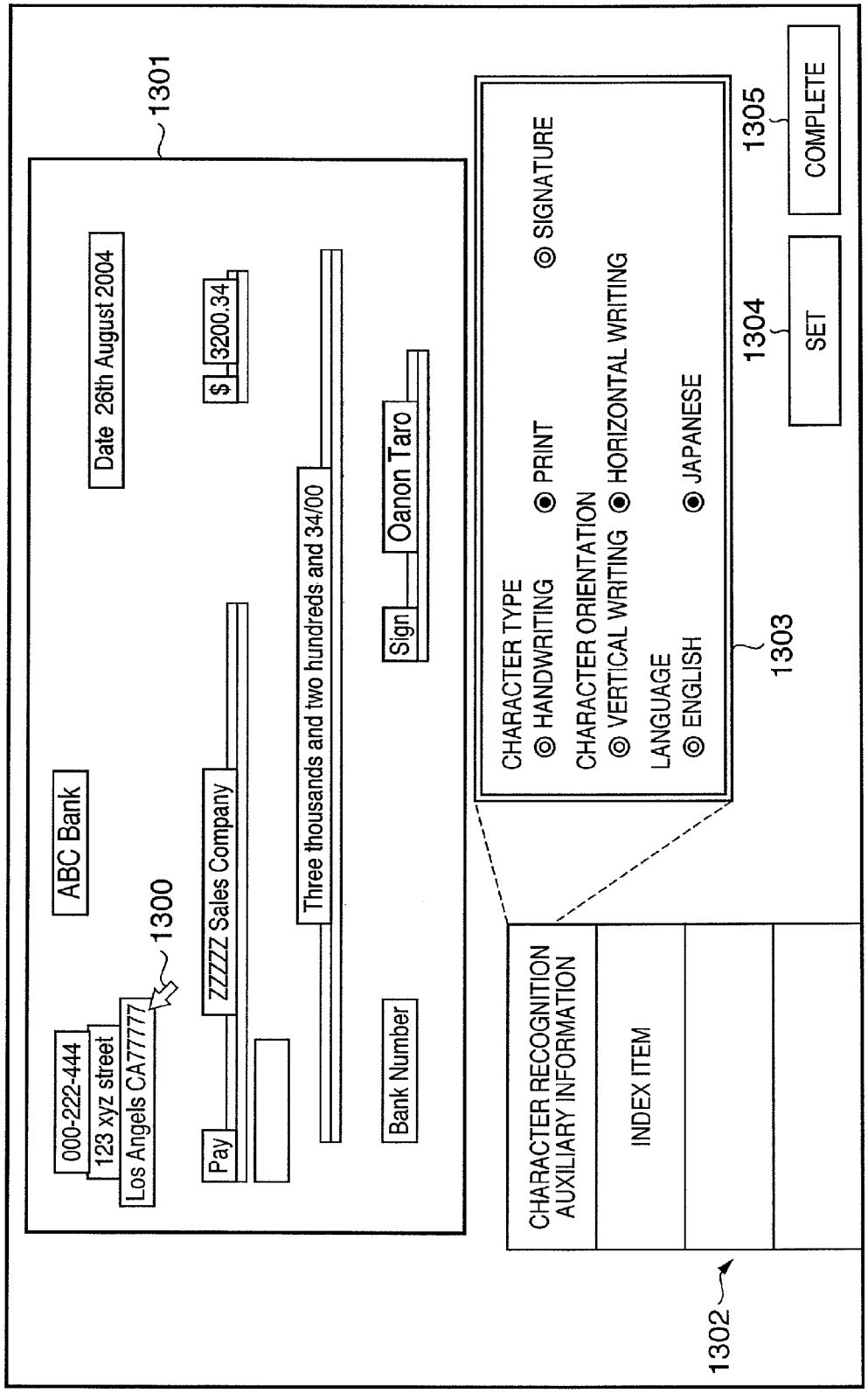
FIG. 13 illustrates an example of user interface upon processing for generation of the form data with two-dimensional barcode by the document management client.

As a result of the area dividing processing at step S801, it is determined whether or not a divided area exists (step S802). If a divided area exists, the process proceeds to step S803 and the subsequent steps to set index extraction information for an arbitrary area. That is, when a divided area exists as shown in FIG. 10, the operator's determination as to whether or not the area is to be used as an index is waited. In this case, the UI unit 101 presents a user interface as shown in FIG. 13 to a display device of the document management client 100. On the other hand, if no divided area exists, the process ends from step S802.

The user interface in FIG. 13 is used for allocation of index item to an area arbitrarily selected by the user, or for setting of auxiliary information for character recognition processing. Note that in the present embodiment, the setting of index extraction information is performed by the combination of an operation of the pointer 1300 and a click operation with a pointing device.

When the index extraction information is set, the pointer 1300 is moved to a desired area in the result of area dividing displayed in a form data image 1301 in the display screen in FIG. 13, and the desired area is clicked. By this operation, the area is selected as the subject of index information setting. When the area has been selected, area information of the selected area (analysis data such as the position of the area on the image and the size of the area) is obtained by the UI unit 101 (step S804).

Note that an, index item and character recognition auxiliary information of the selected area are further set. When the area has been selected with the pointer 1300, a menu 1302 appears, and setting of index item and character recognition auxiliary information can be performed. As index items, "company name", "address" and the like are prepared. The operator can select a desired index item. Note that the operator may additionally register index items arbitrarily. The character recognition auxiliary information means information on characters recognized in the area such as character type (handwrite, print, signature etc.), character orientation (vertical writing, horizontal writing etc.) and language (English, Japanese etc.). FIG. 13 shows a setting window 1303, which is used when "character recognition auxiliary information" is selected from the menu 1302.

By the above user interface, the setting of the selected area is completed, then, when a setting button 1304 has been clicked, index extraction information regarding the selected area is recorded in the memory. That is, the coordinates and size of the area obtained from the layout analysis data are stored in the memory (step S805), and the index item set by the operator is stored in the memory (step S806). Then, the character recognition auxiliary information set by the operator is stored in the memory (step S807), and the process returns to the processing at step S803.

Note that the above index extraction information is stored, as form information, in a form description language. The form description language is in conformance with the XML (extensible Markup Language). FIG. 11 is a conceptual diagram showing the form information to be stored. A description 1101 indicates the position and size of the area; a description 1102, an index item (name); and a description 1103, the character recognition auxiliary information. In FIG. 11, the area position (coordinates) is (50,50), and the area size is 100×300. Note that assuming that the upper left corner of a document as (0,0), the area position is represented by the number of pixels in X- and Y-directions (downward direction is positive). The area size is also represented by the number of pixels in the X- and Y-directions. Further, in FIG. 11, the index item is "Company Name". The character type is print (1), the language is English (3), and the character orientation is horizontal (2). In FIG. 11, the information between tags <ZONE_1> and </ZONE_1>(including area position information 1101, index item 1102 and character recognition auxiliary information 1103) is referred to as index information.

In the processing at step S803, when the index extraction information is not set any more, i.e., when the completion button 1305, indicating that there is no more area as a subject of index setting, has been clicked, the process proceeds to step S808. At step S808, it is determined whether or not form information stored in the form description language exists. If it is determined that form information exists, the image processing unit 201 generates two-dimensional barcode image data representing the form information (step S809). The two-dimensional barcode image data is combined with a form image where data is not inputted as shown in FIG. 12 by the image processing unit 201 (step S810), and is stored in the document management server 110. Otherwise, the form image is transmitted via the network 140 to the digital multi-function device 130 then print-outputted, and is handled as paper form data. Note that the position where the barcode is combined may be determined based on the user's designation with the user interface as shown in FIG. 13, or may be determined by automatically recognizing blank space in the form image using the result of area dividing in FIG. 10.

Note that in the present embodiment, the setting of index extraction information is performed on an arbitrary area in accordance with the operator's designation, however, it may be arranged such that check processing is performed on all the areas obtained by the area dividing processing. Further, in the present embodiment, the area divided by the area dividing processing is handled as an index extraction area, however, an index extraction area may be arbitrarily designated by the operator. Further, the index extraction information is represented with a two-dimensional barcode, however, the form of representation of the index extraction information is not limited to the two-dimensional barcode. Any other pattern or recording method may be employed as long as the index extraction information can be recognized. For example, the index extraction information may be (i) represented with a one-dimensional barcode,
(ii) combined as a character string without being converted to a barcode,
(iii) embedded as an electronic watermark in a form image, or
(iv) recorded as attribute information of the form image, and written in an RF-ID embedded in a paper sheet upon printing of the form.

Note that in the method (iv) is premised on the use of a form print sheet where a readable and writable RF-ID is embedded.

When a form data sheet with index, generated in the above processing, is used, index extraction from document image data can be easily performed upon storage of the document in the present information processing apparatus. In this case, as a two-dimensional barcode indicating index extraction information is recorded in the document image itself, even when documents in plural types of document forms exist, the document can be registered without selection of index extraction information.

Next, the document registration by the document management client 100 according to the present embodiment will be described. Particularly, processing to extract an index from a document generated using the form data sheet with two-dimensional barcode generated as above will be described. FIG. 14 is a flowchart showing the document registration processing by the document management client 100. Hereinbelow, the processing will be described with reference to FIG. 14.

First, the operator places a document image to which a two-dimensional barcode is attached on an original table, then designates scanning, and the process starts (step S1300). The original scanning may be performed by using, e.g., the scanner unit 131 of the digital multi-function device 130. When scanning has been performed (step S1301), image data of the read document is transferred to the image analysis unit 202. Then it is determined from the transferred image data whether or not a two-dimensional barcode exists (step S1302). If it is determined that no two-dimensional barcode exists, the process proceeds to step S1313, and the image data is stored in the form described in FIGS. 3A to 3C and FIGS. 4A and 4B, in the document management server 110.

If it is determined that a two-dimensional barcode exists in the image data of the read document, the process proceeds from step S1302 to step S1303, at which analysis processing is performed on the two-dimensional barcode. It is determined from the result of analysis whether or not the form information described in the form description language is stored (step S1304). If it is determined that no form information exists, it is determined whether or not any other two-dimensional barcode image exists on the image data (step S1305). If it is determined that another two-dimensional barcode exists, the process returns to step S1303, at which the analysis processing is performed on the two-dimensional barcode. If it is determined at step S1305 that no unidentified two-dimensional barcode exists, as there is no two-dimensional barcode indicating form information in the image data, the process proceeds to step S1313, at which the image data is stored in the form described in FIGS. 3A to 3C and FIGS. 4A and 4B, in the document management server 110. Note that well-known techniques can be applied to the determination of the presence/absence and position of barcode from a read image and the extraction and analysis of barcode.

If it is determined at step S1304 that a two-dimensional barcode describing form information exists, the form information is expanded from the two-dimensional barcode, and the process proceeds to step S1306 and the subsequent steps. First, unprocessed index information is obtained from the form information (step S1306). Then an index item (1102 in FIG. 11) is extracted from the index information, and it is determined whether or not the index item is already registered in the index management server (step S1307). If the index item is not registered (new index item), the index item is added to the index table 500 in FIG. 5A (step S1308). Next, information indicating the position and size of the area (1101 in FIG. 11) is extracted from the index information, and image data in an area designated with the information is extracted from the image data (step S1309). Further, character recognition auxiliary information (1103 in FIG. 11) is extracted from the form information, and the character recognition processing is performed on the extracted area image data in a mode designated with the character recognition auxiliary information (step S1310). For example, it may be arranged such that plural types of character recognition processings are prepared, then appropriate character recognition processing is selected and performed based on the character recognition auxiliary information, otherwise, a recognition dictionary is selected based on the character recognition auxiliary information.

Then, text data obtained by the character recognition processing, as index data, is added, with an index ID of the index item to be linked, to the index data table 501 (step S1311). Note that a data ID specifying the newly-added index data is allocated to the newly-added index data, and the index data is recorded in the index data table 501.

Next, it is determined whether or not the next (unprocessed) index information exists in the form information (step S1312). If it is determined that unprocessed index information exists, the process returns to step S1306 to repeat the above processing. If it is determined that no unprocessed index information exists, i.e., the extraction processing on all the index data has been completed, the process proceeds to step S1313, at which the document is registered in the form described in FIGS. 3A to 3C and FIGS. 4A and 4B.

At step S1313, the image data is stored in the volume server unit 115, and the various document attributes of the image data are stored in the attribute management server unit 112. Then, at step S1314, the document ID is linked with the index data, and the process ends (step S1315). That is, at step S1315, in the index data table 501, the document ID is registered in a document ID cell corresponding to the newly added index data.

Note that if it is determined at step S1302 or S1305 that no form information exists and the index information extraction is not performed, the processing at step S1314 is skipped. Further, it may be arranged such that if it is determined at step S1302 or S1305 that no form information exists, index information is manually extracted. In this case, the above-described area dividing is performed and a user interface similar to that shown in FIG. 13 is presented. Then, desired area and index item are designated, then index information is extracted and registered in the index data table 501.

As described above, in the document management system according to the present embodiment, a two-dimensional barcode is generated to include form information and information for index extraction, the two-dimensional barcode is added barcode to an image of form (such as ledger sheet) to generate combined image data of the form image and the two-dimensional barcode image. When, a form, outputted on a medium such as a paper sheet using the combined image data, is optically read, and stored and managed in the document management system, the index information is automatically extracted from the image data and the information is stored. Accordingly, as it is unnecessary for a user to previously set combination of information in the image data and an index item, a registration operation can be efficiently performed, thus the operability can be greatly improved.

Further, according to the above embodiment, the way of extraction of index information, in stead of index data itself, is recorded in the two-dimensional barcode. Accordingly, even when the content of an original to be scanned has been changed, the original is merely read and registered (for example, the document ID is designated and the updated original image is registered), thereby the index data can be updated. That is, the index data can be flexibly and easily updated. Further, according to the present embodiment, index extraction from a designated area is performed in accordance with an index extraction method stored in the two-dimensional barcode. As the character recognition auxiliary information indicating e.g. character type, language and character orientation is registered in each of designated areas, the character recognition processing can be performed in an optimum character recognition mode in each of designated areas. Thus, the accuracy of index data extraction can be improved.

The embodiment of the present invention has been described as above. The present invention can be implemented as a system, an apparatus, a method, a program, a storage medium or the like. More particularly, the present invention can be applied to a system constituted by a plurality of devices or to an apparatus comprising a single device.

Note that the invention includes a case where the object of the invention is attained by directly or remotely supplying a software program realizing the functions of the above-described embodiment (in the embodiment, a program corresponding to the flowcharts shown in the drawings) to a system or apparatus, and reading and executing the supplied program code by a computer of the system or apparatus.

Accordingly, the program code itself installed in the computer to realize the functional processings of the present invention realizes the present invention. That is, the present invention includes the computer program to realize the functional processings of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiment are implemented by executing the read program by computer, an operating system or the like running on the computer may perform all or a part of the actual processing in accordance with designations of the program so that the functions of the above embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing in accordance with designations of the program so that the functions of the above embodiment can be implemented by this processing.

According to the present invention, a document registration work into a document management system can be facilitated.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-021824 filed on Jan. 28, 2005, which is hereby incorporated by reference herein in its entirety.

What is claimed is:

1. An information processing apparatus having a central processing unit, comprising:

a dividing unit configured to perform area dividing processing on document image data, wherein the area dividing processing divides a document image of the document image data into a plurality of areas;

a designation unit configured to receive from a user an instruction for designating an area on which a character recognition processing is to be performed, from the plurality of areas divided by said dividing unit, wherein the character recognition processing analyzes a document image of the designated area and obtains text data from the designated area;

a setting unit configured to receive from the user an instruction for setting an index item which is to be related with text data to be obtained from the designated area by the character recognition processing;

a generation unit configured to generate index extraction information indicating the area designated by said designation unit and the index item set by said setting unit, the index extraction information being constructed for use by an information processing apparatus to perform the character recognition processing on the designated area and to relate text data obtained from the designated area by the character recognition processing with the set index item; and a combining unit configured to generate combined data by combining the index extraction information generated by said generation unit and form image data corresponding to the document image data, wherein if the combined data is printed and a printed image of the combined data is scanned, an information processing apparatus obtains the index extraction information from the scanned image, performs the character recognition processing on the area of the scanned image indicated by the obtained index extraction information and relates text data obtained from the area of the scanned image by the character recognition processing with the index item indicated by the obtained index extraction information.

2. The apparatus according to claim 1, wherein said generation unit generates image data of a pattern image representing said index extraction information, and wherein said combining unit combines the image data of the pattern image generated by said generation unit with said document image data.

3. The apparatus according to claim 1, wherein said information indicating the area includes position coordinates and size of the area in the document image.

4. The apparatus according to claim 1, wherein said setting unit receives from the user an instruction for setting auxiliary information including at least one of a type of character, a direction of character and language, for character recognition processing, and wherein said index extraction information generated by said generation unit further includes said auxiliary information.

5. An information processing method, comprising:

a dividing step of performing area dividing processing on document image data, wherein the area dividing processing divides a document image of the document image data into a plurality of areas;

a presentation step of presenting a user interface to designate an area on which a character recognition processing is to be performed, from the plurality of areas divided at said dividing step, wherein the character recognition processing analyzes a document image of the designated area and obtains text data from the designated area, and a user interface to set an index item which is to be related with the text data to be obtained from the designated area by the character recognition processing;

a generation step of generating index extraction information indicating the area designated via the user interface presented at said presentation step and the index item set via the user interface presented at said presentation step, the index extraction being constructed for use by an information processing apparatus to perform the character recognition processing on the designated area and to relate text data obtained from the designated area by the character recognition processing with the set index item;

a combining step of generating combined data by combining the index extraction information generated at said generation step and form image data corresponding to the document image data;

a scan step of scanning the printed image of the combined data, after the combined data is printed;

an analysis step in which an image obtained by the scanning of the printed image of the combined data is analyzed by an information processing apparatus to obtain the index extraction information;

a character recognition step in which character recognition processing is performed by an information processing apparatus on the area of the scanned image indicated by the index extraction information obtained at said analysis step to obtain text data; and a relating step in which the text data obtained by the character recognition processing is related with the index item indicated by the index extraction information obtained at said analysis step.

6. A storage medium holding a control program for executing the information processing method in claim 5 with a computer.

7. The apparatus according to claim 1, wherein the index extraction information is described in a form description language.

8. The apparatus according to claim 2, wherein said pattern image comprises a two-dimensional barcode image.

9. The apparatus according to claim 1, further comprising:

an analysis unit configured to analyze an image obtained by scanning a printed image of the combined data to obtain the index extraction information;

a recognition unit configured to extract an image of the area indicated by the obtained index extraction information, and perform character recognition processing on the extracted image; and a relating unit configured to relate text data obtained by said recognition unit with the index item indicated by the obtained index extraction information.

10. An information processing apparatus having a central processing unit, comprising:

a dividing unit configured to perform area dividing processing on document image data, wherein the area dividing processing divides a document image of the document image data into a plurality of areas;

a designation unit configured to receive from a user an instruction for designating an area on which a character recognition processing is to be performed, from the plurality of areas divided by said dividing unit, wherein the character recognition processing analyzes a document image of the designated area and obtains text data from the designated area;

a setting unit configured to receive from the user an instruction for setting an index item which is to be related with text data to be obtained from the designated area by the character recognition processing;

a generation unit configured to generate index extraction information indicating the area designated by said designation unit and the index item set by said setting unit, the index extraction information being constructed for use by an information processing apparatus to perform the character recognition processing on the designated area and to relate text data obtained from the designated area by the character recognition processing with the set index item; and a combining unit configured to generate combined data by combining the index extraction information generated by said generation unit and form image data corresponding to the document image data, wherein if the combined data is printed such that the printed image includes a visual representation of the index extraction information, and the printed image of the combined data is scanned, an information processing apparatus obtains area information and an index item from the scanned visual representation of the index extraction information, performs the character recognition processing on the area of the scanned image indicated by the area information from the scanned visual representation of the index extraction information and relates text data obtained from the area of the scanned image by the character recognition processing with the index item indicated by the index item obtained from the scanned visual representation of the index extraction information.

* * * * *